United States Patent [19]
Weber

[11] Patent Number: 5,937,174
[45] Date of Patent: *Aug. 10, 1999

[54] SCALABLE HIERARCHIAL MEMORY STRUCTURE FOR HIGH DATA BANDWIDTH RAID APPLICATIONS

[75] Inventor: Bret S. Weber, Wichita, Kans.

[73] Assignee: LSI Logic Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/673,654

[22] Filed: Jun. 28, 1996

[51] Int. Cl.$^6$ .............................. G06F 13/38; G06F 12/08
[52] U.S. Cl. .................... 395/309; 395/308; 395/182.04; 395/891; 711/113
[58] Field of Search ..................................... 711/113, 114; 395/182.04, 309, 285, 286, 831, 891

[56] References Cited

U.S. PATENT DOCUMENTS

| | | | |
|---|---|---|---|
| 4,965,723 | 10/1990 | Kirk et al. | 395/307 |
| 5,083,260 | 1/1992 | Tsuchiya | 395/293 |
| 5,113,369 | 5/1992 | Kinoshita | 395/307 |

(List continued on next page.)

FOREIGN PATENT DOCUMENTS

| | | |
|---|---|---|
| 0489504 | 11/1991 | European Pat. Off. . |
| 0631241 | 12/1994 | European Pat. Off. . |
| 0717357 | 12/1995 | European Pat. Off. . |
| 0756235 | 1/1997 | European Pat. Off. . |
| 9314455 | 7/1993 | WIPO . |

OTHER PUBLICATIONS

"PCI Local Bus Specification Revision 2.1"; PCI Special Interest Group, Jun. 1, 1995, p. 4.
A Case for Redundant Arrays of Inexpensive Disks (RAID); David A. Patterson et al.; Dec. 1987; pp. 1–24.
IBM Technical Disclosure Bulletin; Method for Improving Peripheral Component Interconnect Bus Bandwidth for Systems with Limited Prefetch; vol. 40 No. 01; Jan., 1997; pp. 23–25.
EDN–Electrical Design News, vol. 40, No. 13, Jun. 22, 1995, MA, US, pp. 16 & 18; Intel i960JF Integrates PCI Interface.
Proceedings of the IEEE International Conference on Computer Design: VLSI in Computers and Processors; Oct. 10–12, 1994; Cambridge, MA, US, pp. 409–412; M.J. Garcia et al: Single Chip PCI Bridge and Memory Controller PowerPC Microprocessors.

*Primary Examiner*—Reginald G. Bragdon
*Attorney, Agent, or Firm*—Wayne P. Bailey; Daniel N. Fishman

[57] ABSTRACT

A cache memory control architecture within a RAID storage subsystem which simplifies the migration and porting of existing ("legacy") control methods and structures to newer high performance cache memory designs. A centralized high speed cache memory is controlled by a main memory controller circuit. One or more bus bridge circuits adapt the signals from the bus architecture used by the legacy systems to the high speed cache memory. The bus bridge circuits each adapt, for example, a PCI bus used for a particular cache access purpose to the signal standards of an intermediate shared memory bus. The main memory controller circuit adapts the signals applied to the intermediate shared memory bus to the high speed cache memory bus. The hierarchical bus architecture permits older "legacy" control methods and structures to be easily adapted to newer cache memory architectures. In addition, the centralized high speed cache memory and associated legacy system busses serve to distribute the load of cache memory access over simultaneously operable busses. The cache memory architecture of the present invention therefore permits rapid porting and re-usability of older "legacy" control methods and structures while permitting the overall cache memory performance to be scaled up to higher bandwidth demands of modern RAID subsystems.

23 Claims, 5 Drawing Sheets

U.S. PATENT DOCUMENTS

| | | | |
|---|---|---|---|
| 5,257,391 | 10/1993 | DuLac et al. | 395/830 |
| 5,263,139 | 11/1993 | Testa et al. | 395/307 |
| 5,301,281 | 4/1994 | Kennedy | 395/307 |
| 5,333,277 | 7/1994 | Searls | 395/281 |
| 5,345,565 | 9/1994 | Jibbe et al. | 395/310 |
| 5,353,415 | 10/1994 | Wolford et al. | 395/306 |
| 5,379,384 | 1/1995 | Solomon | 395/308 |
| 5,392,407 | 2/1995 | Heil et al. | 395/293 |
| 5,394,528 | 2/1995 | Kobayashi et al. | 395/307 |
| 5,396,602 | 3/1995 | Amini et al. | 395/293 |
| 5,522,050 | 5/1996 | Amini et al. | 395/306 |
| 5,533,204 | 7/1996 | Tipley | 395/288 |
| 5,548,730 | 8/1996 | Young et al. | 395/280 |
| 5,557,758 | 9/1996 | Bland et al. | 395/308 |
| 5,559,968 | 9/1996 | Stancil et al. | 395/306 |
| 5,560,022 | 9/1996 | Dunstan et al. | 395/750.01 |
| 5,574,937 | 11/1996 | Narain | 395/800.23 |
| 5,581,714 | 12/1996 | Amini et al. | 395/308 |
| 5,586,268 | 12/1996 | Chen et al. | 395/858 |
| 5,590,377 | 12/1996 | Amith | 395/842 |
| 5,594,882 | 1/1997 | Bell | 711/212 |
| 5,608,876 | 3/1997 | Cohen et al. | 395/281 |
| 5,631,912 | 5/1997 | Mote, Jr. | 371/22.32 |
| 5,632,021 | 5/1997 | Jennings et al. | 395/309 |
| 5,634,033 | 5/1997 | Stewart et al. | 711/114 |
| 5,644,470 | 7/1997 | Benedict et al. | 361/686 |
| 5,664,122 | 9/1997 | Rabe et al. | 395/308 |

SCALABLE HIERARCHIAL MEMORY STRUCTURE FOR HIGH DATA BANDWIDTH RAID APPLICATIONS

BACKGROUND OF THE INVENTION

1. Field of the Invention

The invention relates generally to RAID controller architecture and in particular to a hierarchical memory interface which provides high bandwidth for RAID data transfers while permitting easy scalability to support slower "legacy" RAID controller software.

2. Related Patents

This patent is related to commonly assigned, co-pending, U.S. Pat. No. 5,634,033, filed Dec. 16, 1994 by Stewart et al., entitled (as amended) DISK ARRAY STORAGE SYSTEM ARCHITECTURE FOR PARITY OPERATIONS SIMULTANEOUS WITH OTHER DATA OPERATIONS, which is hereby incorporated by reference.

This patent is related to commonly assigned, co-pending, U.S. patent application Ser. No. 08/674,592, filed Jun. 28, 1996 by Corrigan et al. entitled INTER-BUS BRIDGE CIRCUIT WITH INTEGRATED MEMORY PORT, which is hereby incorporated by reference.

3. Discussion of Related Art

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures is automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks (RAID)*, reviews the fundamental concepts of RAID technology.

There are five "levels" of standard geometries defined in the Patterson publication. The simplest array, a RAID level 1 system, comprises one or more disks for storing data and an equal number of additional mirror disks for storing copies of the information written to the data disks. The remaining RAID levels, identified as RAID level 2,3,4 and 5 systems, segment the data into portions for storage across several data disks. One of more additional disks are utilized to store error check or parity information. A single unit of storage is spread across the several disk drives and is commonly referred to as a "stripe." The stripe consists of the related data written in each of the disk drive containing data plus the parity (error recovery) information written to the parity disk drive.

RAID storage subsystems typically utilize a control module that shields the user or host system from the details of managing the redundant array. The controller makes the subsystem appear to the host computer as a single, highly reliable, high capacity disk drive. In fact, the RAID controller may distribute the host computer system supplied data across a plurality of the small independent drives with redundancy and error checking information so as to improve subsystem performance and reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

Processing of I/O requests generated by a host computers requires significant data bandwidth transferring data to and from the cache memory. For example, data read from the disk array of the RAID storage subsystem into the cache memory may be transferred to a requesting host computer system to satisfy a read I/O request. Other data may be received from a host computer system and transferred to the cache memory to satisfy a write I/O request. Simultaneous with such host initiated transfers of data, background operations performed by the RAID controller of the RAID storage subsystem may post data in the cache memory to the drive array or read data from the disk array to the cache memory. All these exemplary data transfer operations between a host computer and the cache memory and between the disk array and the cache memory require a portion of the total available bandwidth on the bus to the cache memory.

As higher performance host computer connections have developed for connecting RAID storage subsystems to host computer systems, the data transfer bandwidth of the RAID cache memory subsystem has become a performance bottleneck. However, changing the architecture of the cache memory subsystem in the evolutionary design of RAID controllers can create problems in supporting older RAID controller software structures. The investment in older RAID controller software can be significant such that it is highly desirable to port the older control software up to newer RAID controller designs. Old system designs which require support (backward compatibility) in newer controller designs are often referred to as "legacy" systems.

If a RAID subsystem design engineer creates a new cache memory architecture to improve overall RAID performance, older legacy system control software and structures may be abandoned due to fundamental changes in the structure of, operation of, and interface to, the new cache memory subsystem. Redesign of the legacy system control algorithms and structures can add significant costs, complexity, and delay to the development and marketing of new RAID controller systems.

It is evident from the above discussion that an improved architecture for RAID controller cache memory design is required to improve performance of the cache memory subsystem while maintaining compatibility with legacy systems.

SUMMARY OF THE INVENTION

The present invention solves the above and other problems, and thereby advances the useful arts, by disclosing a RAID controller architecture which provides a high performance cache memory design while simplifying the task of porting (supporting) older "legacy" RAID control software methods. The present invention provides for a hierarchy of lower level interface busses to attach "legacy" RAID control software systems to a centralized high performance cache memory through an intermediate shared memory bus structure. The hierarchical levels of busses are used to distribute the load of the various data exchange and manipulation tasks involving the cache memory. The intermediate shared memory bus is designed to meet the higher performance requirements of modern cached RAID controllers and is shared by the lower level hierarchical busses in order to provide access to the high speed cache memory subsystem.

The present invention includes a main memory controller circuit which manages a wide (preferably 64-bit wide), high speed, cache memory and is adaptable to a wide variety of memory speeds, memory sizes, and memory error detection/correction methods. This main memory controller circuit includes a high performance RAID parity generation and detection portion to enable high speed parity computation functions in parallel with other access to the data stored in the high speed cache memory. Bus bridge circuits of the present invention are used to adapt older "legacy" software control methods and structures to the new high speed cache architecture. The bus bridge adapts signals applied to a bus used by the legacy subsystems to the signal standards of an intermediate shared memory bus. A specific bus bridge circuit is used for each specific type of legacy system cache memory architecture. The intermediate shared memory bus connects one or more bus bridge circuits to the main memory controller circuit. The legacy system control methods and structures may therefore be easily ported and re-used in the higher performance cache environment of the present invention.

The main memory controller circuit is configurable to manage various sizes, geometries, and speeds of memory devices which comprise the high performance cache memory. In the preferred embodiment of the present invention, the high speed cache memory managed by the main memory controller chip is 72-bits wide (64 data bits plus 8 bits for error correcting codes). The main memory controller circuit is also configurable to utilize a variety of memory error detection and correction techniques to permit scaling to newer memory error correction techniques.

The main memory controller circuit permits access to the high performance cache memory through an intermediate shared memory bus for shared connectivity to cache memory bus designs of legacy systems (such as 32 and 64 bit PCI busses). The intermediate shared memory bus provides for high performance shared access to the main memory controller circuit by the bus bridge circuits. Legacy systems are connected to the intermediate shared memory bus by bus bridge circuits of the present invention which adapt the legacy system's PCI bus (for example) to the intermediate shared memory bus of the main memory controller circuit.

In the preferred embodiment, the intermediate shared memory bus utilizes a plurality of gigabit-per-second parallel to serial transceiver devices to provide a high speed bus connection with a minimum pin count. For example, eight such transceivers may be utilized to provide a "byte-wide serial" intermediate shared memory bus between the bus bridge circuits and the main memory controller circuit.

The main memory controller circuit and the bus bridge circuits also connect to a 32-bit processor bus independent of the intermediate shared memory bus used for high performance cache memory access. The central processor of the RAID controller connects to the 32-bit processor bus to control the operations of the main memory controller circuit, the bus bridge circuits, and all circuits connected to the legacy bus through the bus bridge circuits. The processor can therefore manage the operation of the bus bridge circuits and the main memory controller circuit without interfering with the operation of the intermediate shared memory bus and associated access to the high performance cache memory. This feature of the present invention enables the main processor to control operations on one bus (the legacy bus and the processor bus) while DMA transfers to the high performance cache memory take place simultaneously on another independent bus (the intermediate shared memory bus).

The circuits of the present invention thereby implement a hierarchical cache memory management structure in which RAID control subsystems, representing a potentially heterogeneous mix of current and legacy control architectures, may share access to a common high performance cache memory subsystem. Each RAID control subsystem connects to a bus bridge circuit of the present invention which adapts that subsystem's particular cache memory bus architecture (e.g., 32 or 64 bit PCI) to a high performance intermediate shared memory bus architecture of the present invention. The intermediate shared memory bus connects each of the bus bridge circuits to a main memory controller circuit which, in turn, adapts the intermediate shared memory bus to the high performance cache memory. The structure and operation of the high performance cache memory of the present invention is therefore independent of any particular RAID controller architecture. The bus bridge circuits of the present invention provide any translation and adaptation of signals required to mate the cache memory bus of a legacy RAID controller to the high performance cache memory and the main memory controller circuit. This independence of the high performance cache memory from any particular legacy RAID control subsystem architecture permits the high performance cache memory to be updated and improved without impacting the support for older legacy RAID control subsystems. A 32-bit processor bus connects a central processing unit to each of the bus bridge circuits and to the main memory controller circuit to control their operation.

This RAID controller architecture is easily scaled up to higher performance cache memory designs by adapting the main memory controller circuit to the required performance enhancing designs. Older legacy subsystems are maintained through such enhancements by adapting the legacy subsystem's cache memory bus to the main memory controller circuit via a bus bridge circuit.

It is therefore an object of the present invention to provide a RAID cache memory architecture with improved data bandwidth capacity.

It is a further object of the present invention to provide a RAID cache memory architecture having a centralized high performance cache memory and intermediate high performance bus for the sharing of the centralized cache memory.

It is still a further object of the present invention to provide a RAID cache memory architecture having a main memory controller for the control of a centralized high performance cache memory system, a plurality of bus bridges for adapting other bus architectures to the main memory controller, and an intermediate bus connecting the plurality of bus bridges and the main memory controller.

It is also an object of the present invention to provide a RAID cache memory architecture which reduces the complexity of re-using legacy control structures from previous RAID controllers.

It is also a further object of the present invention to provide a RAID cache memory architecture including a centralized high performance cache memory and at least one bus bridge for adapting a slower and/or smaller bus to the centralized high performance cache memory thereby enabling re-use of legacy control structures from previous RAID controllers.

It is still a further object of the present invention to provide a RAID cache memory architecture including a centralized high performance cache memory, a plurality of bus bridges for adapting slower and/or smaller busses to the centralized cache memory, and an intermediate bus connecting the plurality of bus bridges and the main memory controller thereby enabling re-use of legacy control structures from previous RAID controllers.

The above and other objects, aspects, features, and advantages of the present invention will become apparent from the following description and the attached drawing.

DETAILED DESCRIPTION OF THE PREFERRED EMBODIMENT

Figure 1:
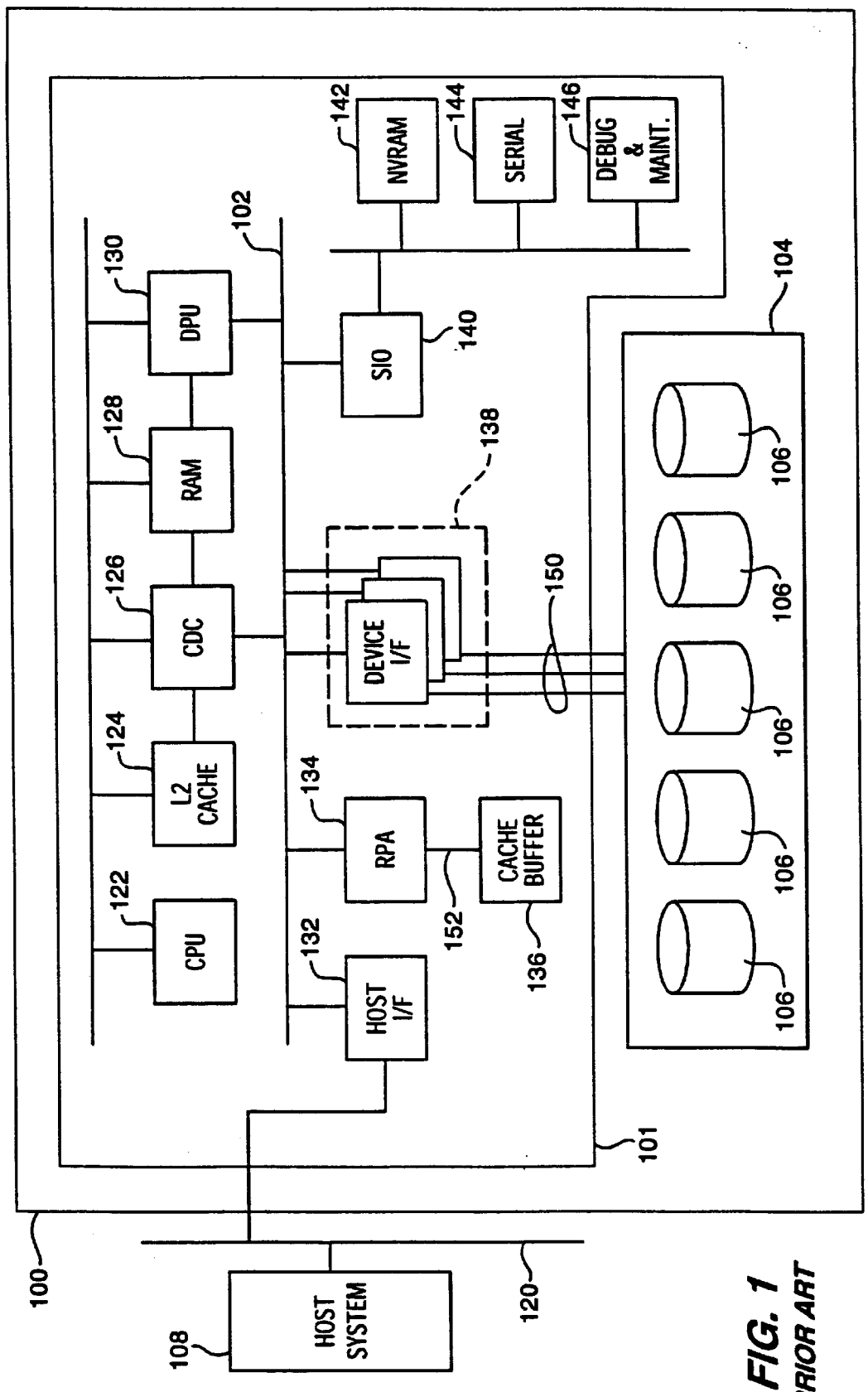
FIG. 1 is a block diagram of a typical RAID storage subsystem as known in the art in which each of a plurality of RAID controllers has a unique cache memory architecture.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Raid Overview

FIG. 1 is a block diagram depicting a typical RAID storage subsystem 100 as is known in the art. RAID storage subsystem 100 is connected by its RAID controller 101 to one or more host systems 108 via bus 120. As is known in the art, bus 120 may commonly be a SCSI bus connection, a Fibre Channel connection, a network connection such as Ethernet or Token Ring, or any of several standard interconnections between host computer systems and storage peripheral devices.

Within RAID storage subsystem 100, a RAID controller 101 processes host computer system generated I/O requests to store and retrieve information from the RAID storage subsystem. RAID controller 101 manages the disk drives of the RAID subsystem to manage the redundancy features of the RAID geometries. RAID controller 101 is connected to RAID array 104 via bus 150. RAID array 104 is comprised of a plurality of storage medium devices such as disk drives 106. As is known in the art, bus 150, may be any of several standard busses utilized in the storage industry to communicate with storage medium devices such as disk drives 106. For example, SCSI, EIDE, IPI, Fibre Channel (FCAL), and other such busses and protocols are commonly used in the storage medium industry to communicate with disk drives. RAID controller 101 utilizes subsets of the disk drives 106 of the RAID array 104 to configure and manage one or more RAID devices on behalf of attached host computer systems.

RAID controller 101 includes CPU 122 in which the RAID control methods are operable. Standard integrated circuit chip sets, well known in the art, are typically utilized to connect CPU 122 to a second level cache (L2 cache 124) and to its main memory (RAM 128) for storage and retrieval of both data and instructions. Cache DRAM controller (CDC 126) and data path unit (DPU 130) exemplify such standard chip sets known (together with system I/O (SIO 140)) as the "Saturn II" chip set manufactured as part number 82420 by Intel® Corporation.

CDC 126 and DPU 130 also serve to connect CPU 122 to a standard I/O bus (such as PCI bus 102) for connection with the peripheral I/O devices used by CPU 122. Specifically, SIO 140 connects standard lower speed devices used in initialization of the RAID controller 101 or used in the maintenance or development of the RAID controller 101. NVRAM 142, serial port 144, and debug/maintenance port 146 may be used, for example, to permanently store the operational programmed instructions for CPU 122 (typically copied to RAM 128 for faster fetch and execution), and to communicate maintenance and debug information to service or design engineers.

Host interface 132, RAID parity assist (RPA) 134, and device interfaces 138 all attach to PCI bus 102 for the exchange of data there between via the common PCI bus 102. Host interface 132 provides a connection between RAID controller 101 and the host connection bus 120 to exchange data between PCI bus 102 and an attached host computer 108. As noted above, connection bus 120 may be a SCSI bus, Fibre Channel, network, or other common connection standards between host computers and peripheral storage devices.

RPA 134 provides connectivity between PCI bus 102 and cache buffer 136 (via bus 152) and provides parity computation assistance for the storage and retrieval of data in cache buffer 136. Host write requests are typically completed by writing the requested data into the cache buffer 136 for later posting to the RAID array 104. Device interfaces 138 connect the disk drives 106 of RAID array 104 to PCI bus 102 for the storage and retrieval of information therefrom.

The RAID parity assist 134 operates on data stored in a local memory (not shown) associated therewith. It calculates parity a burst at a time utilizing an internal 128 byte FIFO (not shown) to store the intermediate results. The intermediate results are not written back to local memory. For maximum performance the control logic for the parity assist engine maintains pointers to each needed data block. The RAID parity assist 134 operates at the full speed of the local memory bus to provide the fastest possible performance for the memory bandwidth.

The parity assist engine contains 4 separate sections that allow additional tasks to be queued up while one task executes. Each task maintains its own control and status register so that task scheduling does not interfere with the currently executing task. Several configuration options are provided to tailor the RPA 134 to the array organization. The engine can be configured as a single engine which works on wide arrays up to 22+1 drives wide, or as a four engine machine which operates with arrays as wide as 4+1 drives. An intermediate mode provides a two engine machine with up to 10+1 drives.

The parity engine includes exclusive-OR logic providing RAID 5 and RAID 3 parity generation/checking as well as move and zero check modes.

One of the most important parts of the RPA architecture is the time independent operation it provides. Blocks of data are not required to be accessed simultaneously for parity calculations. Disk operations which span several drives may be scheduled and executed as soon as possible by each device. Unrelated disk operations may continue even though all drive operations for a single task are not yet complete. This independence improves the performance of the slowest part of the system, the disk drive. It also simplifies the software task of managing concurrent hardware resource requirements.

Further details regarding the structure and operation of RPA 134 are contained in co-pending U.S. Pat. No. 5,634,033 filed Dec. 16, 1994.

The principle operational purpose of CPU 122 is to exchange data between an attached host computer system 108 and the RAID array 104 through cache buffer 136 in satisfaction of host computer generated I/O requests. As can be seen from the above discussed structure, all such exchanges of data pass through PCI bus 102. Specifically, host generated I/O requests typically cause the exchange of data between cache buffer 136 and host computer 108 through PCI bus 102 (and through host interface 132 and RPA 134). Likewise, later posting of data by cached RAID controller 101 typically causes the exchange of data between cache buffer 136 and RAID array 104 through PCI bus 102 (and through RPA 134 and device interfaces 138).

As performance requirements have continued to rise, concurrent operations through PCI bus 102 involving the exchange of data in cache buffer 136 have saturated the bandwidth capacity of PCI bus 102. As is known in the art, PCI bus 102 may be replaced or enhanced by higher performance bus architectures. However, fundamental architectural changes in the bus structure often require significant, costly changes in the control methods (the control software) operable within RAID controller 101.

Centralized High Bandwidth Cache Memory Overview

Figure 2:
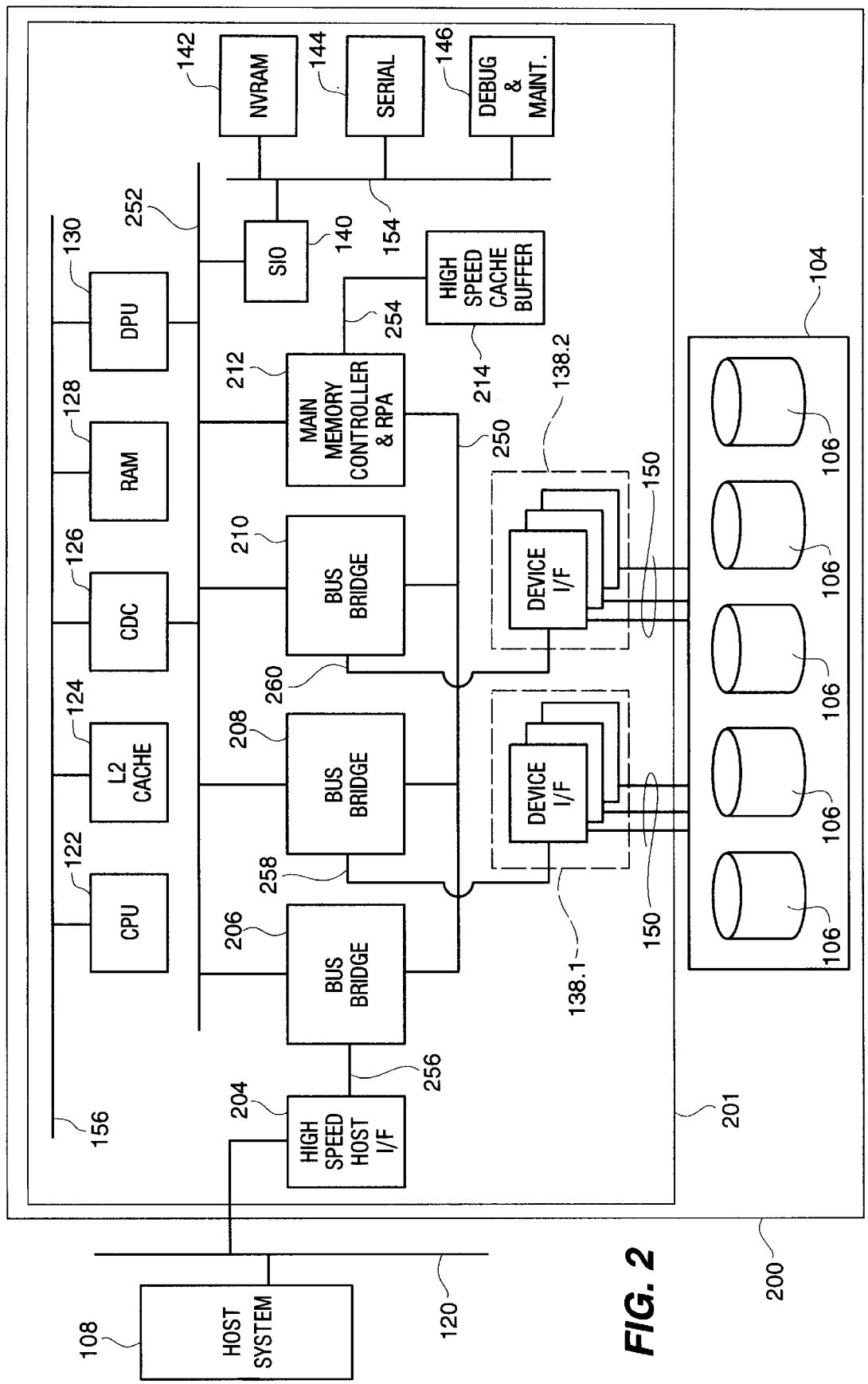
FIG. 2 is a block diagram of a RAID storage subsystem in which the centralized high performance cache memory control structures of the present invention are applied.

FIG. 2 is a block diagram describing the structure of a RAID storage subsystem 200 in which the present invention is applied to improve the cache memory bandwidth capacity while minimizing the need for costly changes in existing "legacy" control systems of the RAID controller. RAID controller 201 within RAID subsystem 200 is similar in many respects, other than the cache memory architecture, to RAID controller 101 of RAID subsystem 100 of FIG. 1. CPU 122, L2 cache 124, CDC 126, RAM 128, and DPU 130 of FIG. 2 are connected through processor bus 156 as described above with respect to FIG. 1. Other system I/O peripheral devices are connected to the processor bus 252 via System I/O (SIO) 140 and bus 154. NVRAM 142, serial port 144, and debug/maintenance port 146 perform similar functions to that described above with respect to FIG. 1. One of ordinary skill in the art will readily recognize that several equivalent chip sets are available to connect CPU 122, L2 cache 124, and RAM 128 to processor bus 252. DPU 130 and CDC 126 are exemplary of such chip sets presently commercially available from Intel® and other integrated circuit manufacturers.

High speed cache buffer 214 comprises a memory array which is both fast and wide to provide adequate bandwidth capacity for aggregated cache buffer accesses in the exchange of information. Main memory controller 212 manages the memory array of high speed cache buffer 214 exchanging data therewith via bus 254. Intermediate shared memory bus 250 connects all other components involved in the exchange of data with high speed cache buffer 214 via main memory controller and RPA 212 and bus 254. All exchange of data between high speed cache buffer 214 and other components of RAID subsystem 200 are managed by the centralized main memory controller 212 and provided thereto via intermediate shared memory bus 250. Main memory controller 212 is therefore isolated from the specific protocols and bus structure of each component within RAID subsystem 200 wishing to exchange data with high speed cache buffer 214 and may therefore be adapted in future evolutionary designs to further enhance bandwidth capacity of the high speed cache buffer 214.

Other components within RAID subsystem 200 requiring the exchange of data with high speed cache buffer 214 through intermediate shared memory bus 250 are connected thereto through a bus bridge. Each bus bridge 206, 208, and 210 adapts the signals applied to their respective, unique, connected bus architecture to the intermediate shared memory bus 250. Specifically, bus bridge 206 adapts signals on bus 256 (e.g., a 32-bit or 64-bit PCI bus) to appropriate signals on intermediate shared memory bus 250 (and vice versa) for purposes of exchanging data between an attached host computer 108, through bus 120 and high speed host interface 204, and the high speed cache buffer 214 under the control of main memory controller 212. In like manner, bus bridges 208 and 210 adapt signals on busses 258 and 260, respectively, for application to intermediate shared memory bus 250 (and vice versa). Bus bridges 208 and 210 thereby provide for the exchange of information between RAID array 104 (through device interfaces 138.1, 138.2) and high speed cache buffer 214 under the control of main memory controller 212.

A first feature of the present invention is that busses 256, 258, and 260 may be implemented for compatibility with older "legacy" control systems operable within RAID controller 201. Legacy systems that depended upon, for example, a 32-bit PCI bus for access to device interfaces 138.1 and 138.2 may be utilized within the RAID controller 201 with the cache architecture of the present invention. Use of such legacy systems reduces the costs and complexity of redesigning new systems compatible with a new cache memory architecture.

A second feature of the present invention is the enhanced aggregate bandwidth for data exchange realized by the plurality of busses hierarchically arranged as described above. Specifically, a high speed cache memory bus architecture is supported by high speed cache buffer 214, bus 254, and main memory controller 212. This high speed cache architecture may be enhanced to utilize the highest performance memory designs available in a particular memory technology. The high speed cache may, for example, make use of DRAM, SRAM, SDRAM, EDRAM, EDO RAM, Burst EDO RAM, or RAMBUS architectures without impacting the portability of legacy control systems in the RAID controller 201. The intermediate shared memory bus 250 provides a high bandwidth shared access path for each of a plurality of legacy system supported busses to exchange data with the high speed cache. Finally, a plurality of legacy system supported busses (e.g., 32 and 64-bit PCI busses) may be intermixed and used, each connected to the intermediate shared memory bus 250 through a bus bridge, to distribute the data exchange bandwidth requirements over a plurality of busses. Each individual bus is therefore less likely to be saturated to its capacity for data exchange.

In particular, data exchange between an attached host computer 108 and the high speed cache buffer 214 may take place concurrently with data exchange between the high speed cache buffer 214 and the disk drives 106 of the RAID array 104. Each of these data exchange operations consumes bandwidth on its own legacy system supported bus (e.g., bus 256 and 258 or 260, respectively). Though the concurrent data exchanges will require use of the intermediate shared memory bus and the main memory controller 212 and bus 254, these components are designed to maximize bandwidth capacity. The cache memory architecture of the present invention is therefore less likely to saturate available data exchange bandwidth.

Main memory controller 212 also may provide RAID parity assist logic (RPA) to provide centralized high speed assistance for the generation and checking of RAID redundancy information. It is common in many RAID storage subsystem to utilize exclusive or (XOR) parity generation and checking for the redundancy information. As used herein, redundancy information includes well known exclusive or parity techniques as well as other encoding methods used to generate and check information used to regenerate erroneous or missing stored data. This feature of the present invention serves to isolate the RAID parity transfers from the individual legacy bus structures as well as the shared memory bus 250. Parity computations are performed internally within RPA circuits of main memory controller 212. This further enhances the distribution of the memory access load from a plurality of legacy systems to a centralized high speed bus structure. The individual legacy busses are therefore less likely to be saturated by such parity accesses. Alternatively, the main memory controller 212 may be directed to allow the device attached to a bus bridge to manage all redundancy information generation and checking.

Processor bus 252 connects CPU 122 to the hierarchical cache memory architecture of the present invention to permit methods operable within CPU 122 to control the operations of the bus bridges 206, 208, and 210, and of the main memory controller 212. This aspect of the present invention enables methods operable within processor 122 to access an individual one of busses (e.g., 256, 258, and 260) without impacting continued high speed data access and processing by the other busses.

The higher bandwidth capacity of the cache memory architecture of the present invention permits the RAID controller 201 to be scaled up for higher performance while minimizing the needs for redesign of older legacy control systems within the RAID controller 201. For example, host interface 204 may be easily scaled up to Fibre Channel host system connections. The higher data bandwidth available in the cache memory architecture of the present invention provides sufficient bandwidth therefor while permitting easier re-use of legacy control systems in the controller. Likewise, device interfaces 138.1 and 138.2 may be scaled up to higher performance disk drive control architectures (e.g., fast SCSI, wide SCSI, SCSI 3, Fibre Channel (FCAL), etc.). The data bandwidth available in the cache architecture of the present invention enables the use of such high performance connections while minimizing the re-design necessary for legacy control structures.

Main Memory Controller Circuit

Figure 3:
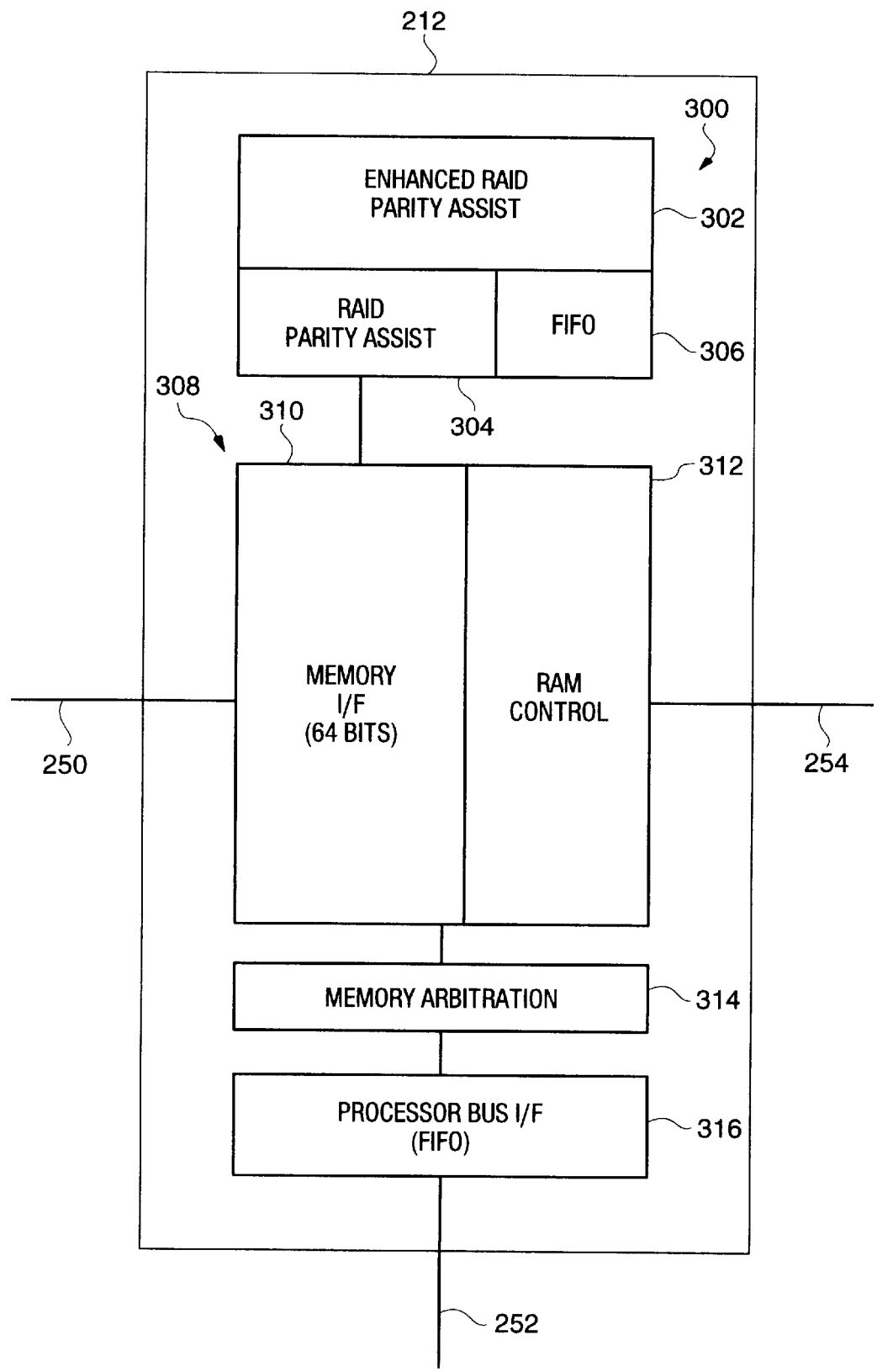
FIG. 3 is a block diagram providing additional details of the structure of the main memory controller circuit of FIG. 2.

FIG. 3 is a block diagram showing additional details of the main memory controller 212 of FIG. 2. Memory control 308 within main memory controller 212 receives address, data, and control information on intermediate shared memory bus 250. The address, data, and control information together define a requested operation within the attached high speed cache buffer (214 of FIG. 2). Memory interface 310 within memory control 308 manages the signals received from and applied to intermediate shared memory bus 250. RAM control 312 within memory control 308 generates appropriate RAM circuit controls and applies them to bus 254 to perform the requested operation in the attached high speed cache buffer (214 of FIG. 2). Memory control 308 may be configured to appropriately control a wide variety of RAM geometries and technologies including DRAM, SRAM, SDRAM, EDO RAM, etc.

In the preferred embodiment, memory control 308 implements a 64-bit wide memory bus on intermediate shared memory bus 250 and controls a 72-bit wide memory bus on bus 254 (64 data bits plus 8 ECC bits). In the preferred embodiment, both intermediate shared memory bus 250 and bus 254 are clocked at a frequency in excess of 60 megahertz (preferably 66 megahertz). In the preferred embodiment, intermediate shared memory bus 250 and bus 254 can therefore sustain a bandwidth in excess of 500 megabytes per second.

RAID parity assist engine 300 within main memory controller 212 performs all required RAID parity generation and checking as data is stored in and retrieved from the high speed cache buffer (214 of FIG. 2). The parity calculations are performed within the RAID parity assist engine 300 without imposing additional load on the various busses of the RAID controller architecture. In particular, the parity computations are performed with a minimum of access to the cache memory 214 by main memory controller 212. The computed parity data may be retrieved from the RAID parity assist engine 300 for direct storage in the high speed cache buffer 214 or the disk array 104, or may be retrieved by the CPU 122 via processor bus 252 for further computation and processing.

Processor bus interface 316 within main memory controller 212 comprises the connection logic and circuits to connect the main memory controller 212 to the processor bus 252. CPU 122 of FIG. 2 configures and controls the operation of main memory controller 212 via processor bus 252. CPU 122 may access high speed cache memory 214 of FIG. 2 through processor bus 252 and processor bus interface 316 of main memory controller 212. Memory arbitration logic 314 arbitrates access to bus 254 requested through intermediate shared memory bus 250 and through processor bus 252. Such memory arbitration and control functions, and commercially available circuits to perform these functions, are well known to those of ordinary skill in the art.

Bus Bridge Circuit

Figure 4:
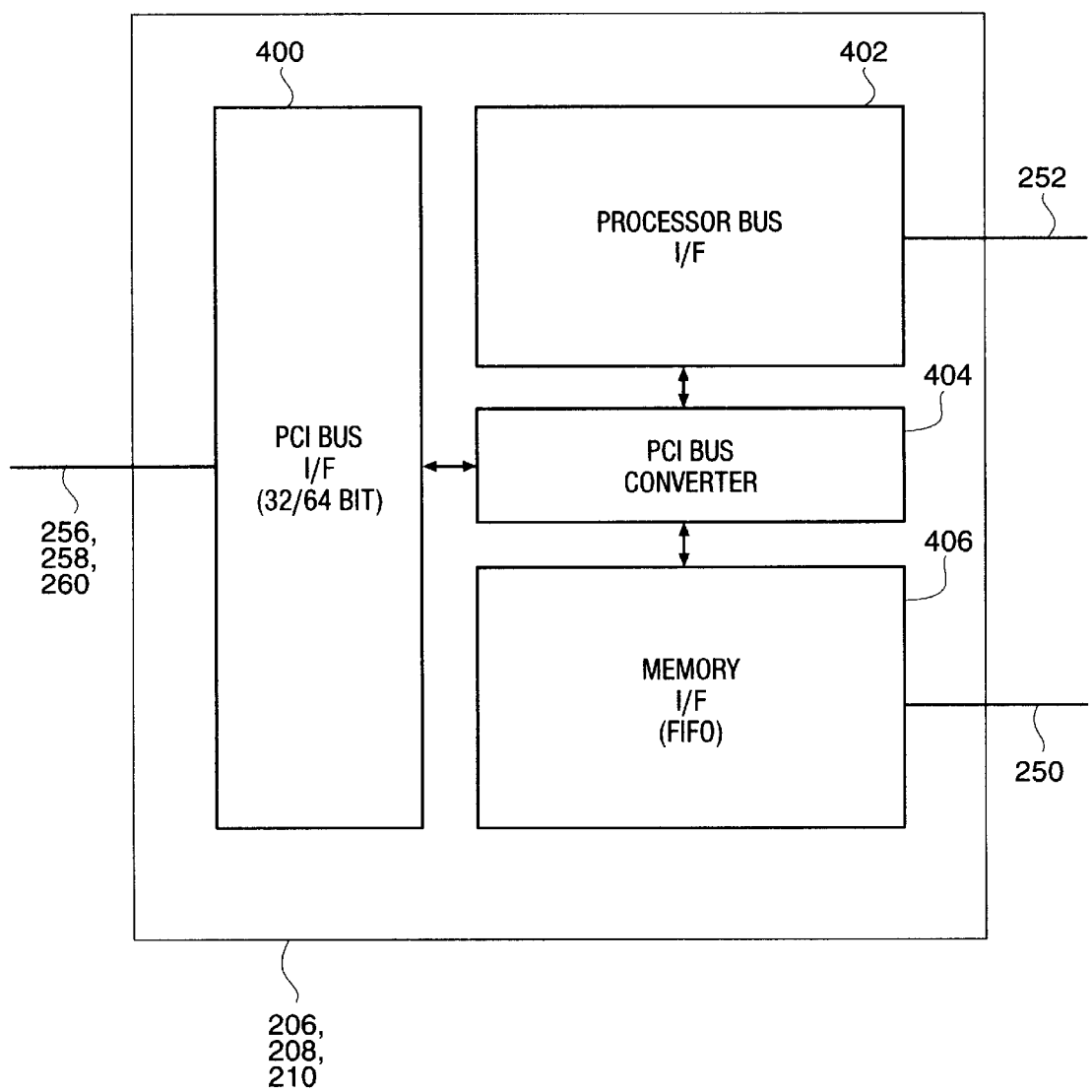
FIG. 4 is a block diagram providing additional details of the structure of the bus bridge circuit of FIG. 2.

FIG. 4 is a block diagram providing additional detail of the structure of bus bridges 206, 208, and 210 of FIG. 3. Bus bridges 206, 208, and 210 exchange signals over their respective attached busses 256, 258, and 260, respectively. As noted above, busses 256, 258, and 260 may be, for example, 32 and 64-bit PCI busses to maintain structural compatibility with older "legacy" control systems within RAID controller 201 of FIG. 2. The signals exchanged over busses 256, 258, and 260 are adapted for exchange over intermediate shared memory bus 250. Each bus bridge, 206, 208, or 210, therefore adapts the legacy control system's preferred bus, 256, 258, or 260, respectively, to the intermediate shared memory bus 250 for access to the high speed cache buffer 214 of FIG. 2.

Within each bus bridge 206, 208, or 210, a PCI bus interface 400 manages the exchange of signals on the legacy control system's preferred bus 256, 258, or 260, respectively. PCI bus converter 404 converts the respective PCI bus signals to the signal levels and timing required for application to the intermediate shared memory bus 250. Memory interface 406 applies the converted PCI bus signals to the intermediate shared memory bus 250 as appropriate for control of the shared bus. Memory interface 406 performs all required bus arbitration and negotiation to share the intermediate shared memory bus among the plurality of bus bridges 206, 208, and 210. Conversely, signals received on the intermediate shared memory bus 250 by memory interface 406 are converted to equivalent PCI bus signals by a PCI bus converter 404 within the bus bridge to which the signals are directed. Finally, PCI bus interface 400 within the bus bridge then applies the converted signals to the connected bus 256, 258, or 260 as appropriate.

As is known in the art, selection signals in intermediate shared memory bus 250 are used to arbitrate the use of the bus to exchange converted signals between the intermediate shared memory bus 250 and a selected one of the plurality of bus bridges 206, 208, and 210.

Processor bus 252 is connected to bus bridges 206, 208, and 210 to permit a CPU (122 of FIG. 2) to control and configure the operation of the bus bridges. In addition, CPU 122 exchanges information and configures peripheral devices directly over the connected PCI busses 256, 258, or 260 via the bus bridges 206, 208, or 210, respectively, without interfering with the exchange of data via intermediate shared memory bus 250. In a manner analogous to that described above, PCI bus converter 404 converts signals between levels and timing required for processor bus 252 as received and generated by processor bus interface 402, and signal levels and timing required for the connected PCI bus 256, 258, or 260 as received and generated by PCI bus interface 400 of the bus bridges.

Bus bridges 206, 208, and 210 convert all signals for exchange between the connected PCI bus 256, 258, or 260 and the intermediate shared memory bus 250 or between the connected PCI bus 256, 258, or 260 and the processor bus 252. This conversion includes all signal level and timing conversions as well as bus width conversions. Specifically, in the preferred embodiment, PCI busses 256, 258, and 260 may be either 32-bit or 64-bit wide PCI busses and may be operated at either 33 or 66 megahertz while the processor bus is a bus appropriate to the selected CPU (for example a 32-bit wide, 33 megahertz PCI bus) and the intermediate shared memory bus is preferably 64-bits wide operating at 66 megahertz. In this preferred embodiment, the shared memory bus 250 is preferably a parallel signal bus providing 64 bit wide data path (plus 8 bits of error correcting codes). In an alternative embodiment, the shared memory bus 250 is implemented as a 128 bit wide data path. To reduce the pin count, the 128 bit wide bus is implemented through use of a plurality of high speed parallel to serial transceivers. For example, eight, sixteen bit wide parallel to serial high speed transceivers may be used in both the bus bridge circuits 206, 208, and 210 and the corresponding memory interface circuits within main memory controller 212 to implement the shared memory bus 250. In another alternative embodiment, a plurality of high speed parallel to serial transceivers are used to reduce the external pin count required for interconnecting bus bridge circuits 206, 208, and 210 and main memory controller circuit 212 via the 64 bit intermediate shared memory bus 250. The 64 bit wide bus is implemented through the use of eight, high speed, eight bit wide parallel to serial transceivers in both the bus bridge circuits 206, 208, and 210 and the corresponding memory interface circuits within main memory controller 212. This structure provides a 64 bit wide internal bus structure but an 8 bit wide serial interface as applied to shared intermediate memory bus 250.

Each bus interface, PCI bus interface 400, processor bus interface 402, and memory interface 406, may include FIFO devices as required for speed and bus width matching purposes. The FIFOs permit each bus interface component and the associated bus to operate at peak efficiency for extended bursts though exchanging data with a different bus architecture.

The processor bus interface 402 of the bus bridge circuit essentially implements a bus bridge to translate the signals exchanged between processor bus 252 and the external legacy system bus 256, 258, or 260. The memory interface 406 portion uses FIFO technologies to buffer the exchange of bursts of data between the legacy system bus 256, 258, or 260 and the shared memory bus 250. This buffering enables speed matching between the legacy system bus 256, 258, or 260 and the higher speed shared memory bus 250.

Intermediate Shared Memory Bus

Figure 5:
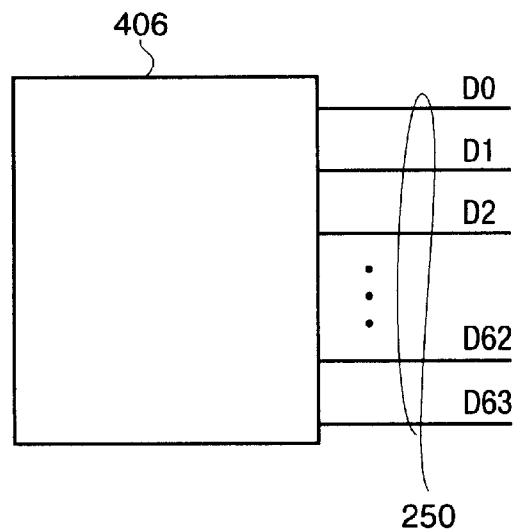
FIG. 5 is a block diagram of a first preferred embodiment of the intermediate shared memory bus of the present invention as a 64-bit-wide parallel bus.

As noted above, the best presently known mode of implementing the intermediate shared memory bus of the present invention is as a 64-data-bit-wide parallel bus clocked at 66 megahertz. FIG. 5 is a block diagram depicting this best presently known structure for intermediate shared memory bus 250 of FIG. 2. Intermediate memory bus 250 of FIG. 5 is connected to the memory interface (FIFO) 406 of bus bridge circuits 206, 208, or 210.

Figure 6:
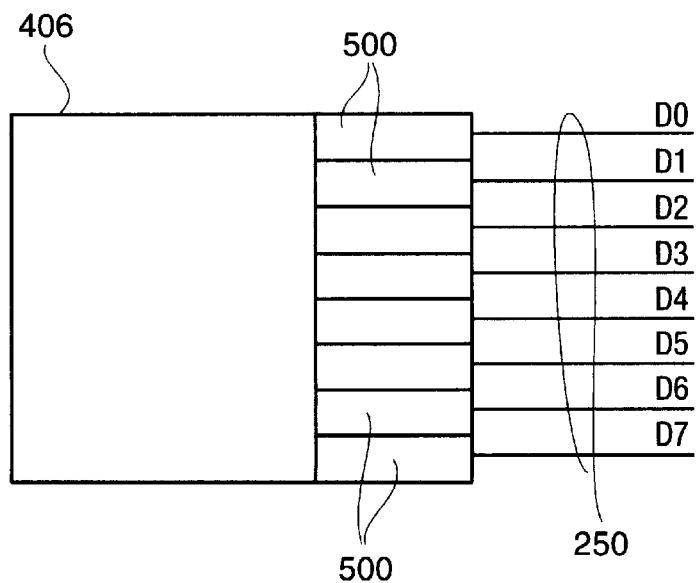
FIG. 6 is a block diagram of a second preferred embodiment of the intermediate shared memory bus of the present invention as a 128-bit-wide parallel to byte serial bus.

FIG. 6 is a block diagram of an alternative embodiment of the intermediate shared memory bus 250 of the present invention in which eight, high speed, 16-bit-wide parallel to bit serial transceivers 500 are integrated into memory interface 406. This structure provides a 128-bit-wide internal bus structure but an 8-bit-wide (byte) serial interface as applied to shared intermediate memory bus 250. This alternate embodiment of the present invention serves to reduce the external pin count required for interconnect of bus bridge circuits 206, 208, and 210 and main memory controller circuit 212 via intermediate shared memory bus 250. The transceivers 500 are capable of data transfer speeds of at least 1 gigabit per second each to thereby provide bandwidth of 1 gigabyte per second over intermediate shared memory bus 250. Alternatively, FIG. 6 is representative of the preferred memory bus 250 of the present invention in which eight, high speed, 8-bit-wide parallel to bit serial transceivers 500 are integrated into memory interface 406. This structure provides 64-bit-wide internal bus structure but an 8-bit-wide (byte) serial interface as applied to shared intermediate memory bus 250. This alternative embodiment of the present invention serves to reduce the external pin count required for interconnection of bus bridge circuits 206, 208, and 210 and main memory controller circuit 212 via intermediate shared memory bus 250.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a storage subsystem, a cache memory controller comprising:

a processor for controlling operation of said cache memory controller;

a main memory controller;

a high speed memory bus coupled to said main memory controller and coupled to a memory bank;

an intermediate shared memory bus coupled to said main memory controller for data transfers;

a plurality of bus bridges coupled to said intermediate shared memory bus wherein each bus bridge of said plurality of bus bridges is coupled to an associated controller specific bus and a processor bus coupling said processor to said main memory controller and coupling said processor to each of said plurality of bus bridges, wherein signals exchanged on each said controller specific bus are converted by the associated bus bridge into signals appropriate for exchange on said intermediate shared memory bus and wherein signals exchanged on said intermediate shared memory bus are converted by said main memory controller into signals appropriate for exchange on said high speed memory bus and wherein said processor exchanges signals with said main memory controller independent of signals exchanged between said controller specific bus and said main memory controller via the associated bus bridge.

2. The controller of claim 1 wherein said main memory controller includes:

a redundancy assist circuit to generate redundancy information associated with the storage of data in said storage subsystem and for using said redundancy information in the operation of said storage subsystem to improve data integrity.

3. The controller of claim 2 wherein said redundancy assist is controllably enabled and disabled.

4. The controller of claim 1 wherein said intermediate shared memory bus is capable of exchanging data between said plurality of bus bridges and said main memory controller at rates in excess of 500 megabytes per second.

5. The controller of claim 4 wherein said intermediate shared memory bus comprises a parallel signal bus.

6. The controller of claim 5 wherein said intermediate shared memory bus comprises a parallel signal bus having a data width of 64 bits.

7. The controller of claim 4 wherein said intermediate shared memory bus comprises:

a multi-bit-wide serial bus;

wherein each bus bridge includes a first plurality of parallel to serial transceivers each having a data transfer rate of at least one gigabit per second; and wherein said main memory controller includes a second plurality of parallel to serial transceivers each having a data transfer rate of at least one gigabit per second.

8. The controller of claim 7 wherein said multi-bit-wide serial bus comprises a 8-bit-wide serial bus and wherein said first plurality of parallel to serial transceivers and said second plurality of parallel to serial transceivers convert 64 parallel signals into signals exchanged over said 8-bit-wide serial bus.

9. The controller of claim 7 wherein said multi-but-wide serial bus comprises an 8-bit-wide serial bus and wherein said first plurality of parallel to serial transceivers and said second plurality of parallel to serial transceivers convert 128 parallel signals into signals exchanged over said 8-bit-wide serial bus.

10. The controller of claim 1, wherein said intermediate shared memory bus is capable of exchanging data between said plurality of bus bridges and said main memory controller at rates in excess of one gigabyte per second.

11. The controller of claim 10 wherein said intermediate shared memory bus comprises a parallel signal bus.

12. The controller of claim 11 wherein said intermediate shared memory bus comprises a parallel signal bus having a data width of 128 bits.

13. The controller of claim 10 wherein said intermediate shared memory bus comprises:

a multi-bit-wide serial bus;

wherein each bus bridge includes a first plurality of parallel to serial transceivers each having a data transfer rate of at least one gigabit per second; and wherein said main memory controller includes a second plurality of parallel to serial transceivers each having a data transfer rate of at least one gigabit per second.

14. The controller of claim 13 wherein said multi-but-wide serial bus comprises an 8-bit-wide serial bus and wherein said first plurality of parallel to serial transceivers and said second plurality of parallel to serial transceivers convert 128 parallel signals into signals exchanged over said 8-bit-wide serial bus.

15. In a storage subsystem, a cache memory controller comprising:

processor means for controlling operation of said cache memory controller;

main memory controller means, coupled to a central cache memory through a high speed memory bus, for controlling access to said central cache memory; and a plurality of bus bridge means, each coupled to said main memory controller means through an intermediate shared memory bus and each coupled to an associated controller specific bus, for accessing said central cache memory by converting signals exchanged on said associated controller specific bus into signals appropriate for exchange on said intermediate shared memory bus and wherein said main memory controller means converts signals exchanged on said intermediate shared memory bus into signals appropriate for exchange on said high speed memory bus;

processor bus means for coupling said processor means to said main memory controller means and for coupling said processor means to each of said plurality of bus bridge means wherein said processor means exchanges signals with said main memory controller means independent of signals exchanged between said controller specific bus and said main memory controller means via the associated bus bridge means.

16. The controller of claim 15 wherein said main memory controller means includes:

redundancy assist means for generating redundancy information associated with the storage of data in said storage subsystem and for using said redundancy information in the operation of said storage subsystem to improve data integrity.

17. The controller of claim 16 wherein said redundancy assist means is controllably enabled and disabled.

18. The controller of claim 15 wherein said intermediate shared memory bus is capable of exchanging data between said plurality of bus bridge means and said main memory controller means at rates in excess of 500 megabytes per second.

19. The controller of claim 18 wherein said intermediate shared memory bus comprises a parallel signal bus.

20. The controller of claim 19 wherein said intermediate shared memory bus comprises a parallel signal bus having a data width of 64 bits.

21. The controller of claim 19 wherein said intermediate shared memory bus comprises:

a multi-bit-wide serial bus;

wherein each bus bridge means includes a first plurality of parallel to serial transceivers each having a data transfer rate of at least one gigabit per second; and wherein said main memory controller means includes a second plurality of parallel to serial transceivers each having a data transfer rate of at least one gigabit per second.

22. The controller of claim 21 wherein said multi-bit-wide serial bus comprises a 8-bit-wide serial bus and wherein said first plurality of parallel to serial transceivers and said second plurality of parallel to serial transceivers convert 64 parallel signals into signals exchanged over said 8-bit-wide serial bus.

23. The controller of claim 21 wherein said multi-but-wide serial bus comprises an 8-bit-wide serial bus and wherein said first plurality of parallel to serial transceivers and said second plurality of parallel to serial transceivers convert 128 parallel signals into signals exchanged over said 8-bit-wide serial bus.

* * * * *